United States Patent
Kerlman et al.

[11] 3,831,028
[45] Aug. 20, 1974

[54] RADIATION DETECTOR USING ELECTRO-OPTICS

[75] Inventors: Isadore B. Kerlman, Jerusalem, Israel; Alfred Strash, Midlothian, Va.; Jacob Kastner, Kensington, Md.

[73] Assignee: The United States of America as represented by the United States Atomic Energy Commission, Washington, D.C.

[22] Filed: June 26, 1973

[21] Appl. No.: 373,714

[52] U.S. Cl................. 250/336, 250/472, 350/150, 356/114
[51] Int. Cl. ............................................. G01t 1/16
[58] Field of Search.................... 250/335, 336, 472; 350/150; 356/114

[56] References Cited
UNITED STATES PATENTS

| | | | |
|---|---|---|---|
| 3,556,662 | 1/1971 | Levenstein et al.................. | 350/114 |
| 3,560,955 | 2/1971 | Hallman............................. | 350/150 |

*Primary Examiner*—James W. Lawrence
*Assistant Examiner*—Davis L. Willis
*Attorney, Agent, or Firm*—John A. Horan; Arthur A. Churm; Walter L. Rees

[57] ABSTRACT

The radiation detector consists of a cell containing a polar liquid positioned between two crossed polarizers. The light beam is directed through the cell to a detector and the polarizers are arranged for extinction of the light. Local birefringence developed by the ionizing radiation permits light to be transmitted to the light detector.

7 Claims, 1 Drawing Figure

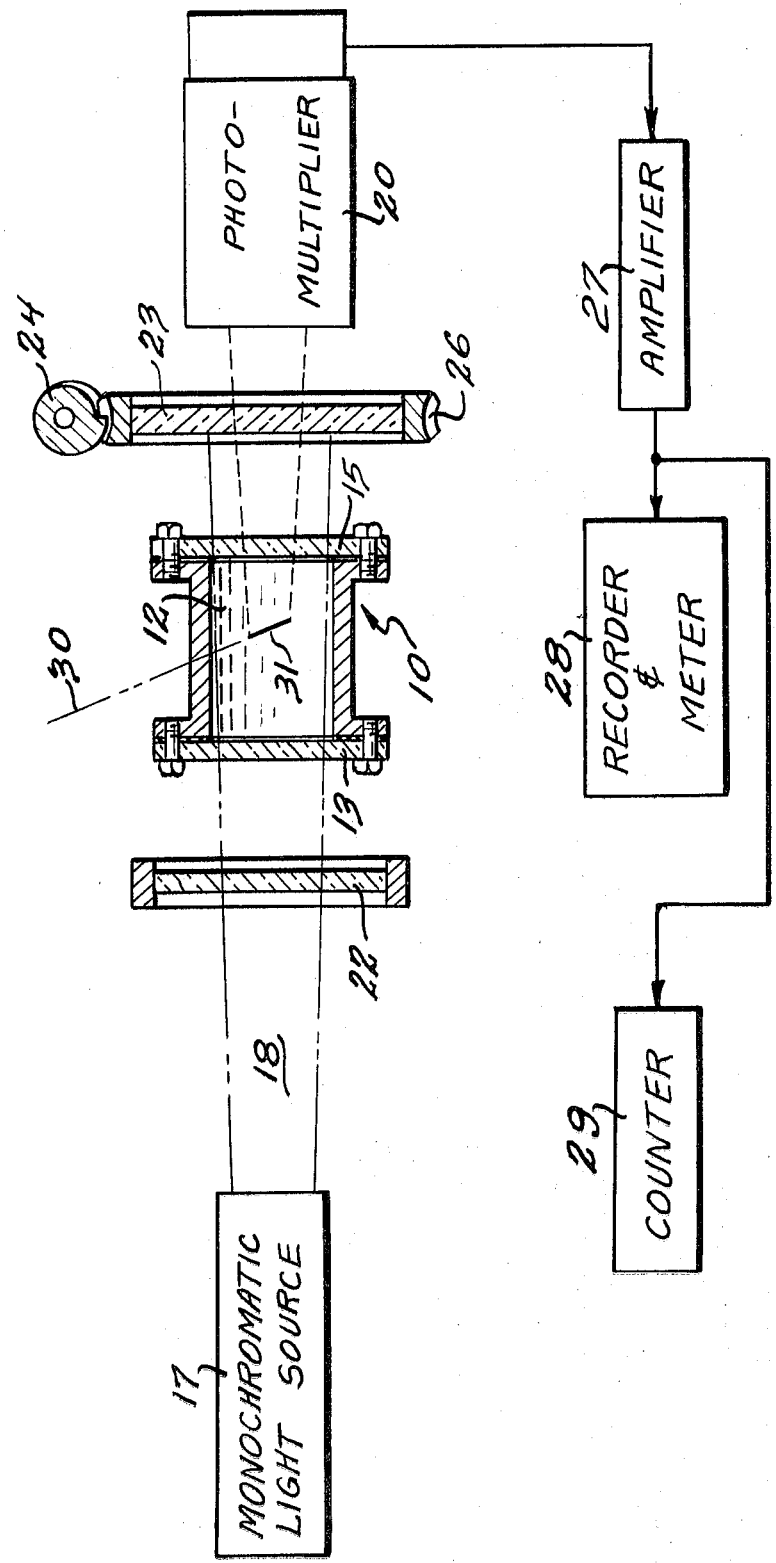

RADIATION DETECTOR USING ELECTRO-OPTICS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In performing radiation experiments, in many cases it is important that highly sensitive, simple radiation detectors be available. While detectors are presently available, many are complex and the sensitivity of many others is low. While there are some simple and sensitive detectors, many of these require that the recorded data be processed before it is available.

It is therefore an object of this invention to provide an improved form of radiation detector.

Another object of this invention is to provide a radiation detector which is sensitive, simple and which develops an output in the form of a signal which can be immediately utilized.

SUMMARY OF THE INVENTION

In practicing this invention, a cell containing a polar liquid is positioned between two crossed polarizers arranged for extinction. A monochromatic light beam is directed through the device and a light detector such as a photomultiplier tube is positioned to intercept the beam. When no radiation is present, the crossed polarizers prevent any of the monochromatic light from reaching the photomultiplier. When a radiation event passes through the liquid, an ionized track is developed in the liquid. The ionized track in the liquid causes a local birefringence which changes the extinction condition, permitting a portion of the monochromatic light to be transmitted to the photomultiplier tube. As soon as recombination has occurred, the local extinction conditions are reestablished and the light beam is again cut off. Of importance is that neutrons can be detected in a gamma field using this type of device, as the electrons developed by gamma radiation do not have enough energy to develop local birefringence, while the neutron radiation does.

BRIEF DESCRIPTION OF THE DRAWINGS

This invention is illustrated in the single drawing, a schematic of the structure of the invention.

DETAILED DESCRIPTION OF THE INVENTION

Referring to the FIGURE, there is shown a cell 10 containing a liquid 12 therein. The liquid in cell 10 is a polar liquid, that is, a liquid wherein an ionizing track will affect locally the refractive index of the liquid. Examples of a polar liquid would be monofluorobenzene, monochlorobenzene, o-dichlorobenzene and o-difluorobenzene.

The cell 10 has windows 13 and 15 which will transmit light. A monochromatic light source 17 develops a light beam 18 which is directed through cell 10 to a photomultiplier 20. Monochromatic light source 17 can be in the form of a laser to provide a high-intensity light output if desired. Also monochromatic light source 17 includes optical means for forming a light beam 18 so that it covers substantially all of the volume of cell 10.

Polarizing plates 22 and 23 are positioned on opposite sides of cell 10. Polarizing plate 23 includes a worm gear 26 surrounding its outer circumference. Worm wheel 24 meshes with the worm gear 26 and, by turning worm wheel 24, polarizing plate 23 is rotated to change the axis of polarization.

The output of photomultiplier 20 is amplified in amplifier 27 and the amplified output is recorded and metered in the recording and metering circuits 28. Recording and metering circuits 28 and the amplifier 27 are conventional circuits, well known in the electronic art, and any desired circuitry can be used for the utilization of the output signal from photomultiplier tube 20. For example, the output of amplifier 27 could be connected to a counter 29 which would count each radiation event detected.

In operation, polarizing plate 23 is rotated so that its axis of polarization is at right angles to the axis of polarization of polarizing plate 22, that is, the plates are arranged for extinction of the light beam 18 from monochromatic light source 17. A radiation event 30 striking the polar liquid 12 produces a local birefringence 31 which rotates the polarization axis of a portion of the polarized light beam entering the polar liquid 12. The local birefringence permits part of the light entering polar liquid 12 to be transmitted through polarizing plate 23 to the photomultiplier tube 20. As soon as recombination has occurred, the local birefringence disappears and the light passing through polarizing plate 23 to photomultiplier tube 20 is extinguished.

The detector has a large gain, as a small amount of radiation energy can cause sufficient local birefringence to permit a relatively large amount of light to pass into photomultiplier tube 20. The device is simple in construction and small enough so that it can be used in many radiation experiments where larger devices would be impractical. The cell 10 also could be enlarged to be used as a bubble chamber for an accelerator.

The embodiments of the invention in which an exclusive property or privilege is claimed are defined as follows:

1. A device for detecting highly ionized radiation comprising, a monochromatic light source for directing a monochromatic light beam along a predetermined path, light detection means positioned in said path for receiving and detecting said light beam, first and second polarizing plates positioned in said path between said light detection means and said light source, a cell containing a polar liquid positioned between said first and second polarizing plates, the axes of said first and second polarizing plates being adjusted to reduce the intensity of said light beam reaching said light detection means to a minimum in the absence of the ionizing radiation, said polar liquid being responsive to the ionizing radiation to develop a local birefringence in the polar liquid thereby increasing the intensity of said light beam reaching said light detecting means to a value greater than said minimum.

2. The ionizing radiation detection device of claim 1, wherein said polar liquid is monofluorobenzene.

3. The ionizing radiation detection device of claim 1, wherein said polar liquid is monochlorobenzene.

4. The ionizing radiation detection device of claim 1, wherein said polar liquid is o-dichlorobenzene.

5. The ionizing radiation detection device of claim 1, wherein said polar liquid is o-difluorobenzene.

6. The ionizing radiation detection device of claim 1, wherein said monochromatic light source is a laser.

7. The ionizing radiation detection device of claim 1, wherein said first polarizing plate is fixed and said second polarizing plate is rotatable, and means for rotating said second polarizing plate to adjust the angle of polarization thereof to reduce the intensity of said light beam to a minimum in the absence of the ionizing radiation.

* * * * *

UNITED STATES PATENT OFFICE
CERTIFICATE OF CORRECTION

Patent No. 3,831,028          Dated August 20, 1974

Inventor(s) Isadore B. Berlman et al.

It is certified that error appears in the above-identified patent and that said Letters Patent are hereby corrected as shown below:

On title page heading, change "Kerlman et al." to --Berlman et al.--.

Inventors, change "Isadore B. Kerlman" to --Isadore B. Berlman--.

Signed and sealed this 29th day of April 1975.

(SEAL)
Attest:

RUTH C. MASON
Attesting Officer

C. MARSHALL DANN
Commissioner of Patents
and Trademarks